No. 633,125. Patented Sept. 19, 1899.
G. P. DAVIS.
DENTAL CUSPIDOR.
(Application filed Feb. 15, 1899.)
(No Model.)
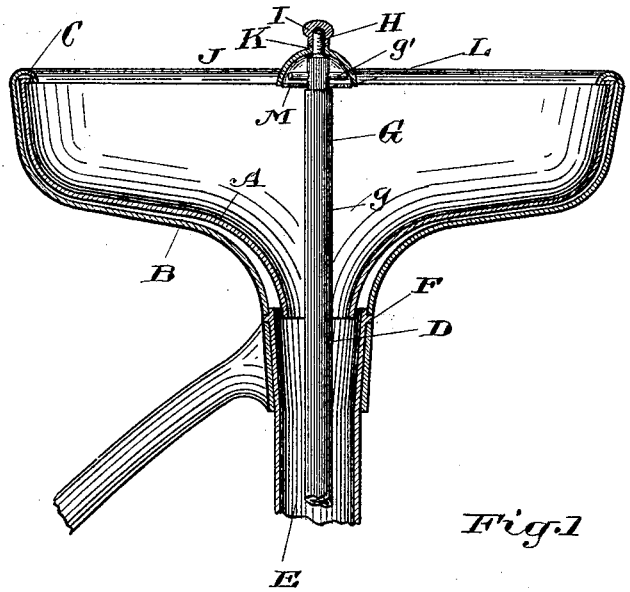
Fig. 1
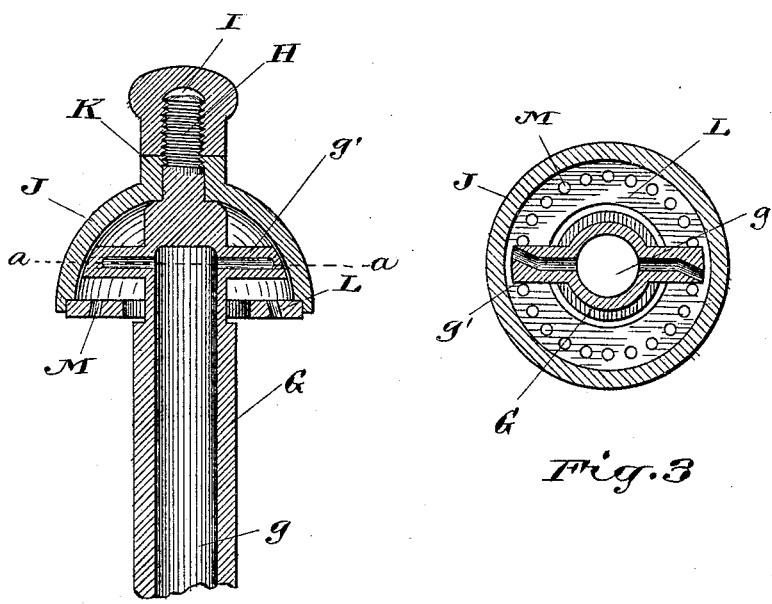
Fig. 2
Fig. 3
Witnesses
Inventor
Geo. P. Davis
by C. H. Riches
his atty
THE NORRIS PETERS CO., PHOTO-LITHO., WASHINGTON, D. C.

UNITED STATES PATENT OFFICE.

GEORGE P. DAVIS, OF TORONTO, CANADA, ASSIGNOR OF ONE-HALF TO THOMAS D. WILSON AND EDWARD J. COUSINS, OF SAME PLACE.

DENTAL CUSPIDOR.

SPECIFICATION forming part of Letters Patent No. 633,125, dated September 19, 1899.

Application filed February 15, 1899. Serial No. 705,525. (No model.)

*To all whom it may concern:*

Be it known that I, GEORGE P. DAVIS, of the city of Toronto, in the county of York and Province of Ontario, Canada, have invented certain new and useful Improvements in Cuspidors for Dental Use; and I hereby declare that the following is a full, clear, and exact description of the same.

This invention relates to certain new and useful improvements in cuspidors, and more particularly to that class of cuspidors used in dental operations. As these cuspidors are ordinarily made of metal, it is necessary in order to keep them comparatively clean and free from the corrosion naturally resulting from the chemical affinity of the metal and expectorated blood to continuously flush them and wash the expectorated matter into the drain-pipe. The continuous flushing of the cuspidor causes the receiving-bowl to sweat and where it is not incased in an outer bowl or covering to present a damp or clammy appearance.

The object of the present invention is to devise a cuspidor which consists of an inner or receiving bowl, preferably made of porcelain or glass, and an outer bowl or casing to inclose the inner bowl, preferably made of metal and provided with a flushing device consisting, essentially, of a water-standard having at or near its top two or more horizontal jets to discharge a corresponding number of diminutive streams of water, a bell-shaped cap or inverted cup loosely mounted on the top of the standard to cover the jets and arranged to be revolved by the force of the diminutive streams, and a perforated flange for the bottom of the bell-shaped cap or inverted cup to atomize the water from the diminutive streams and centrifugally distribute it to the inner or receiving bowl of the cuspidor, as hereinafter more fully set forth, and more particularly pointed out in the claims.

In the drawings, Figure 1 represents a sectional view of a dental cuspidor. Fig. 2 is an enlarged sectional view of the injector or flushing device. Fig. 3 is a sectional view on the lines *a a*, Fig. 2.

Like letters of reference refer to like parts throughout the specification and drawings.

A represents the inner or receiving bowl, which is preferably made of glass, porcelain, or other similar substance, and B represents the outer bowl incasing the inner bowl A, preferably made of metal, plated or polished. By making the inner bowl A of glass or porcelain and furnishing it with a polished surface it is possible to avoid the corrosion resulting from the affinity of the blood and metal and wash the expectorated matter quickly from the bowl into the drain-pipe. The top of the outer bowl A is provided with an inturned or annular flange C, which overhangs the top of the inner bowl A and prevents the water creeping over the top of the cuspidor. The inner and outer bowls A and B, respectively, are of a frusto-conical shape and are each provided with a central opening or passage D, which communicates with the bore of the drain-pipe E. The drain-pipe E and outer bowl B are provided with a coupling F, by means of which the cuspidor is fitted to the drain-pipe.

Located centrally in the cuspidor is a water-standard G, consisting of a perpendicular pipe *g*, the top of which is fitted with two horizontal water-jets *g'* to discharge horizontally two diminutive streams of water in a direction substantially tangential to the inner surface of the cap or cup. Although the water-standard is shown to be fitted only with two jets *g'*, it may be fitted with any number of jets to distribute a corresponding number of diminutive streams. Projecting upwardly from the top of the water-standard G is a perpendicular pin H, screw-threaded to receive a nut I. Mounted on the top of the standard G is a bell-shaped cap or cover J for the jets *g'*. The top of the cover J is provided with a central bore K, through which passes the pin H. The nut I is so fitted on the pin H as to allow the cover a revoluble movement when actuated by the force of the diminutive streams of water from the jets and to prevent the vertical movement of the cap or cover J when assembled in position. The edge of the cap or cover J is fitted with an internal flange L, which surrounds the water-standard G below the jets $g'$. The flange L is provided with a considerable number of perforations M to atomize the diminutive streams of water from the jets $g'$ and to cause its centrifugal distribution during the revolution of the cap or cover J.

The operation of the device is as follows: The water passes through the pipe $g$ to the jets $g'$, which are provided with diminutive outlets to minimize the size of the streams and discharge them in a direction substantially tangential to the inner surface of the cap or cup. The water is ejected from the jets $g'$ against the inner side of the cap or cover J. The cap or cover J is caused to revolve by the force of the diminutive streams or jets $g'$, which after striking against the inner side of the cap or cover J descend to the flange L and pass through the perforations M. The revolution of the cap or cover J causes the water after passing through the perforations M to be centrifugally distributed to the bowl with sufficient force to thoroughly cleanse it from all expectorated matter. The water is distributed to the bowl as close to the rim as possible and with sufficient force to cause it to thoroughly cleanse all parts of the same, (the flange C of the outer bowl B preventing the water creeping over the top).

A flushing device of this description uses but a minimum amount of water and at the same time accomplishes the purposes for which it is constructed and without splashing the water over the edges of the cuspidor.

Having thus fully described my invention, what I claim as new, and desire to secure by Letters Patent, is—

1. A flushing device for a dental cuspidor consisting of a water-standard having an outlet port or ports, and a revoluble cap fitted to the water-standard to cover the ports, having an annular perforated flange encircling the standard below the ports to atomize and centrifugally distribute the water to the bowl, substantially as specified.

2. A flushing device for a dental cuspidor consisting of a water-standard, fitted at its upper end with a water jet or jets having diminutive outlets, a revoluble cap mounted on the top of the water-standard covering the water-jets, and a perforated flange for the cap encircling the water-standard below the water-jets, to atomize and centrifugally distribute the water to the bowl, substantially as specified.

3. A dental cuspidor consisting of an inner bowl, an outer bowl inclosing the inner bowl provided with an inturned flange overlapping the top of the inner bowl, and a flushing device consisting of a water-standard centrally located within the inner bowl having a port or ports, and a revoluble cap for the water-standard covering the ports, and fitted with an annular perforated flange encircling the standard below the ports to atomize and centrifugally distribute the water to the bowl, substantially as specified.

4. A dental cuspidor consisting of an inner bowl, an outer bowl inclosing the inner bowl, provided with an annular inturned flange overlapping the top of the inner bowl, and a flushing device consisting of a water-standard centrally located within the inner bowl, fitted at its upper end with a water jet or jets, a revoluble cap mounted on the top of the water-standard covering the water-jets, and an annular flange for the cap surrounding the water-standard below the water-jets, to atomize and centrifugally distribute the water to the bowl, substantially as specified.

Toronto, Canada, February 4, A. D. 1899.

GEORGE P. DAVIS.

In presence of—
C. H. RICHES,
M. A. WESTWOOD.